(12) United States Patent
Cornu et al.

(10) Patent No.: US 6,209,199 B1
(45) Date of Patent: Apr. 3, 2001

(54) METHOD OF MANUFACTURING A HIGH HEAT FLUX REGENERATIVE CIRCUIT, IN PARTICULAR FOR THE COMBUSTION CHAMBER OF A ROCKET ENGINE

(75) Inventors: Daniel Cornu, Vernon; Christophe Verdy, Belfort; Jean-Michel De Monicault, Croisy sur Eure; Christian Coddet, Giromagny, all of (FR)

(73) Assignee: Societe Nationale d'Etude et de Construction de Moteurs d'Aviation-S.N.E.C.M.A., Paris (FR)

( * ) Notice: Subject to any disclaimer, the term of this patent is extended or adjusted under 35 U.S.C. 154(b) by 0 days.

(21) Appl. No.: 09/271,394

(22) Filed: Mar. 17, 1999

(30) Foreign Application Priority Data

Mar. 20, 1998 (FR) ..................................... 98 03438

(51) Int. Cl.⁷ .................................... B23P 15/00
(52) U.S. Cl. ........................ 29/890.01; 29/889.7
(58) Field of Search ................ 29/890.1, 889.7, 29/428, 890.02, 527.4; 60/257

(56) References Cited

U.S. PATENT DOCUMENTS

| 3,690,103 | * | 9/1972 | Dederra et al. | 29/890.01 |
| 5,249,357 | * | 10/1993 | Holmes et al. | 29/890.01 |
| 5,613,299 | * | 3/1997 | Ring et al. | 29/890.01 |
| 5,855,828 | * | 1/1999 | Tuffias et al. | 29/890.1 |
| 5,875,549 | * | 3/1999 | McKinley | 29/890.01 |

FOREIGN PATENT DOCUMENTS

| 0 413 983 | 2/1991 | (EP) . |
| 2 268 166 | 11/1975 | (FR) . |
| 10 018911 | 1/1998 | (JP) . |

OTHER PUBLICATIONS

Adherent Thermal Barrier for Combustion Chamber: *NTIS Tech Notes*, Feb. 1, 1990, p. 155, XP000103867.

* cited by examiner

*Primary Examiner*—I Cuda Rosenbaum
(74) *Attorney, Agent, or Firm*—Weingarten, Schurgin, Gagnebin & Hayes LLP

(57) ABSTRACT

A regenerative circuit structure is built up by implementing the following steps in particular:

- an intermediate layer is made on a support core representing the inner profile of the structure;
- a series of channels regularly distributed around the core is made with the channels opening to face the intermediate layer, each of the channels being provided with a soluble insert;
- the support core is preheated and the body of the structure is made by thermal spraying under a vacuum;
- channels are machined in the body from the outside, and said channels are filled by means of soluble inserts;
- a closure layer is formed to close the channels in the body, and an outer envelope is formed by thermal spraying under a vacuum, after preheating; and
- all of the soluble inserts and the intermediate layer are eliminated.

30 Claims, 6 Drawing Sheets

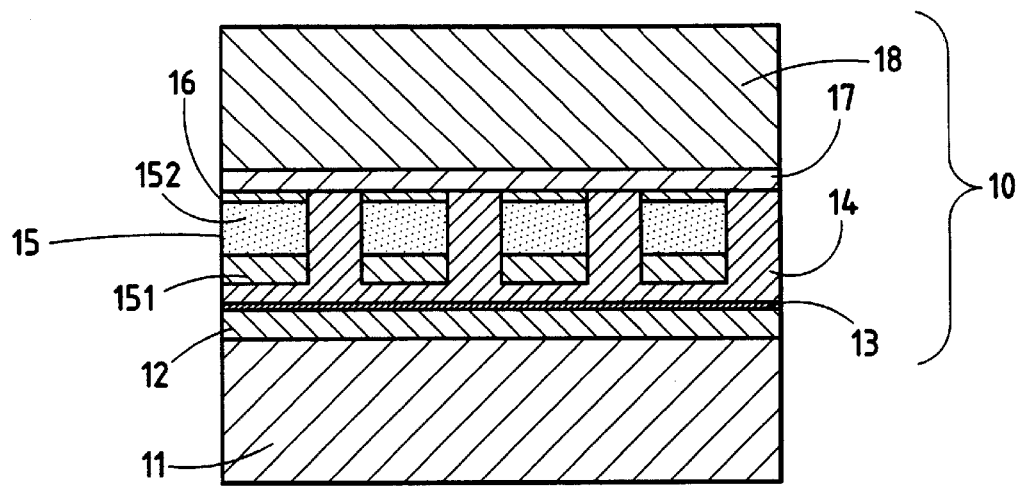
FIG.1
FIG.2
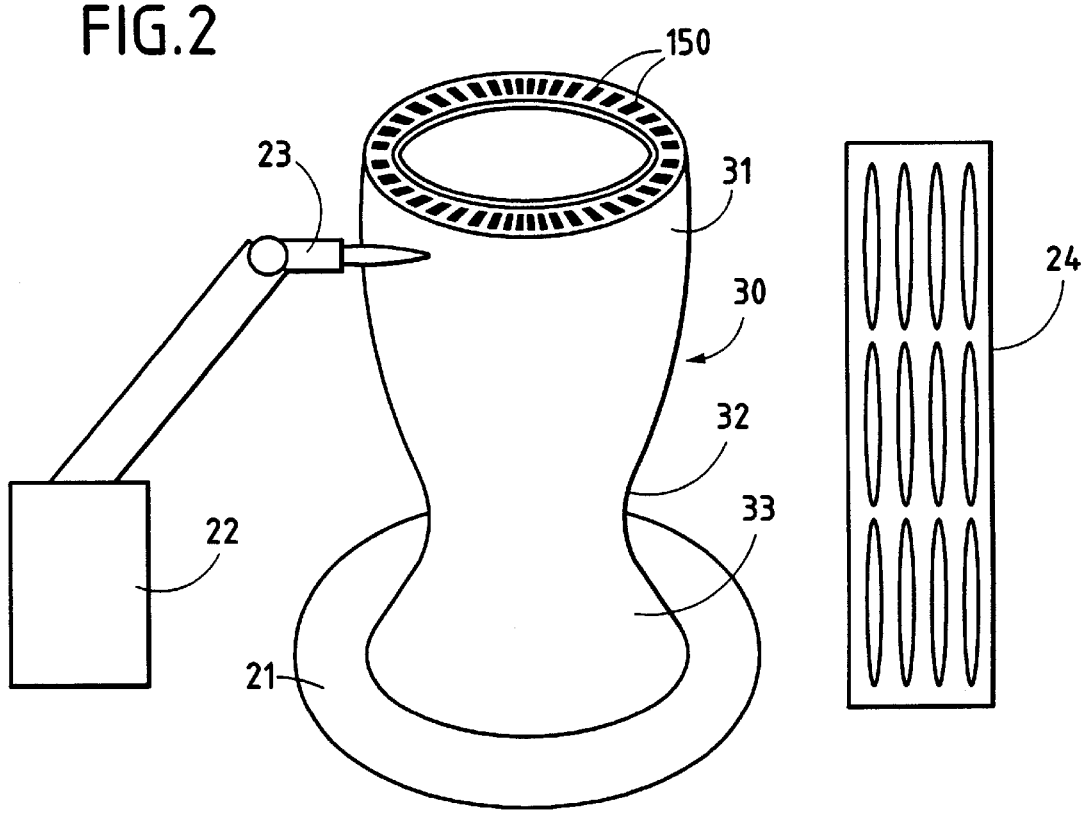

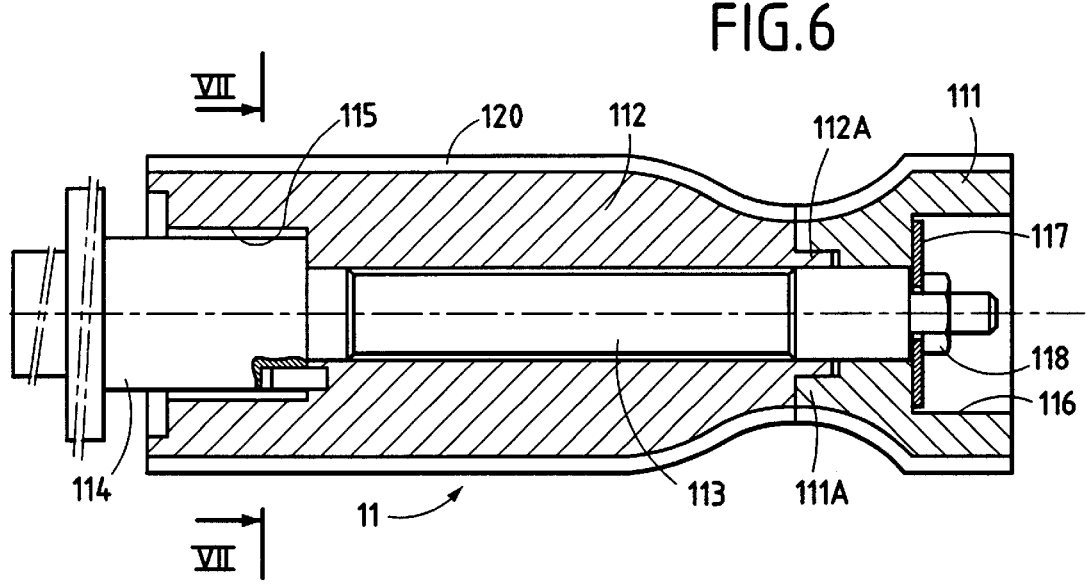
FIG.6
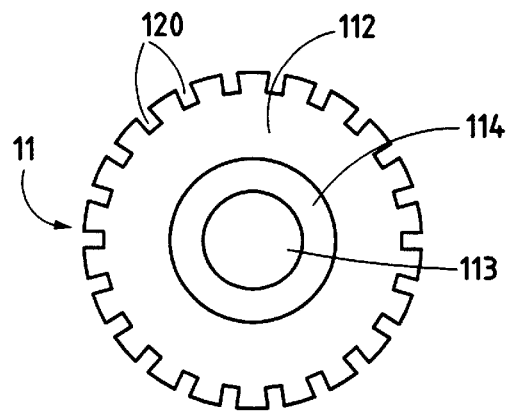
FIG.7
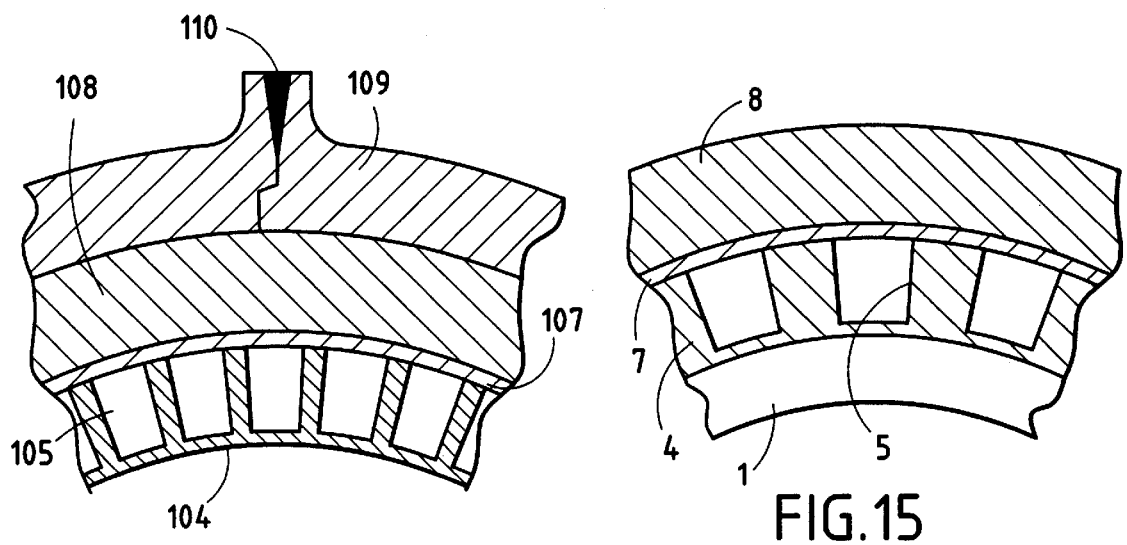
FIG.14
FIG.15

METHOD OF MANUFACTURING A HIGH HEAT FLUX REGENERATIVE CIRCUIT, IN PARTICULAR FOR THE COMBUSTION CHAMBER OF A ROCKET ENGINE

FIELD OF THE INVENTION

The present invention relates to a method of manufacturing a high heat flux regenerative circuit comprising a structure having an inner functional surface in contact with a first fluid and a set of channels formed in the body of the structure for conveying a second fluid in heat exchange relationship with the first fluid, the method consisting in using thermal spraying and machining operations around a reusable support core to build up the structure from said inner functional surface.

The invention also relates to a high heat flux regenerative circuit obtained by the method, such as the rocket engine combustion chamber.

Structures constituting high heat flux regenerative circuits are used in various contexts, for example in heat exchangers, in turbine blades cooled by a circulating liquid, or in the walls of combustion enclosures.

Thus, combustion enclosures, such as the combustion chambers and nozzles of rocket engines, in particular engines using liquid propellants, have walls which are in contact with combustion gases that constitute a high temperature medium, and such walls are generally cooled while they are in operation.

A common cooling technique consists in providing the walls of such enclosures with cooling channels. This applies in satellite launchers and space planes, and also in satellite thrusters, nuclear reactors, and high efficiency boilers, and it can also apply to heat shields or to the nose cones of vehicles traveling at very high speed.

Specifically in the context of rocket engines, various methods have already been proposed for manufacturing the walls of combustion chambers to enable cooling channels extending in a longitudinal direction to be included therein, which channels convey a cooling fluid that may be one of the propellant components used for feeding the rocket engine, so that the cooling system thus constitutes a regenerative system.

The techniques for manufacturing such combustion chambers are nevertheless difficult to implement, lengthy, and expensive.

In certain particular applications, it is also useful to be able to heat up an enclosure that is cold, by causing a hot fluid to circulate via passages formed in the wall of the enclosure, which thus also constitutes a regenerative circuit.

PRIOR ART

In a first technique for manufacturing regeneratively-cooled combustion chambers for liquid propellant rocket engines, cooling channels are machined in an inner base body formed as a single piece of a metal that is a good conductor of heat, such as copper. The cooling channels are thus separated from one another by partitions of the base body, and an outer cover is made by electrodeposition of multiple layers of nickel alternating with machining corrections that are necessary between each of the electrodeposition passes. The channels are closed prior to electrodeposition by applying a conductive resin.

FIG. 14 shows an example of a combustion chamber wall made using that technique.

An inner jacket 104 that is made by forging, e.g. out of a metal material such as Narloy Z, has cooling channels 105 that are made by machining.

A layer 107 for closing the channels 105 is made by electrodeposition and is itself covered in nickel that is likewise deposited by electrodeposition. Various elements of the outer shell 109 made of a superalloy such as Inconel-718, for example, are assembled together via joins 110 by means of electron beam welding.

The operations of forming the inner jacket 104 of the combustion chamber and of closing the channels 105 by electrodeposition constitute major drawbacks of that method. Those operations are lengthy and expensive. Furthermore, each of the welds 110 used for final assembly of the components of the chamber constitutes a potential risk of breakage. In a second prior art technique of combustion chamber manufacture, attempts have been made to eliminate those disadvantages by using the plasma-forming methods.

FIG. 15 shows an example of a combustion chamber wall made using that second manufacturing technique which consists in making all or part of the structure of the combustion chamber by thermally spraying powders of defined alloys.

In an example of such a method in which the wall of the combustion chamber is made starting from the inside and going towards the outside of the chamber, a spraying core 1 is made out of mild steel machined to the inside dimensions of the combustion chamber that is to be obtained.

First spraying under a partial vacuum then serves to use copper alloy (Narloy Z, . . . ) to make the jacket 4 of the future chamber on the surface of the core 1. The following operation consists in machining the cooling channels 5 and in inserting a consumable filler material therein. After excess filler has been removed by machining, a second operation of spraying the copper alloy under partial vacuum enables a layer 7 to be formed for closing the channels. Immediately thereafter, the superalloy shell 8 is built up directly on the copper jacket by thermal spraying. The final operation consists in chemically eliminating the filler material so as to open up the channels 5, and also so as to remove the spraying core 1.

Proposals have also been made to provide a support core built up from a plurality of parts, thus making it possible to reuse the core. By way of example, a core can be constituted by two stainless steel cones that are separated from each other by a washer of mild steel, with the assembly being covered in a deposit of steel. Once the combustion chamber has been made, the dissolving of the inserts placed in the cooling channels is accompanied by dissolving the washer and the steel deposit. The two cones can then be removed and recovered.

Nevertheless, known methods remain relatively unsatisfactory, in particular because of the slowness of the process whereby the inserts are dissolved and the temporary layers are eliminated, and because of difficulties in making structures that are of large dimensions in satisfactory manner.

OBJECT AND BRIEF SUMMARY OF THE INVENTION

The object of the invention is to remedy the above-specified drawbacks and to enable regenerative circuit structures to be manufactured in a manner that is more convenient than in prior art methods while also making it possible to optimize the characteristics of the manufactured structures, even when the structures are of large dimensions and are subjected to high heat flux densities.

According to the invention, these objects are achieved by a method of manufacturing a high heat flux regenerative circuit comprising a structure having an inner functional surface in contact with a first fluid and a set of channels formed in the body of the structure for conveying a second fluid in heat exchange relationship with the first fluid, the method consisting in using thermal spraying and machining operations around a reusable support core to build up the structure from said inner functional surface, the method being characterized in that it comprises the following steps:

a) placing a support core representing the inner profile of the structure about an axis of rotation, the support core being made of a material whose coefficient of thermal expansion is very close to or slightly greater than that of the body material of the structure;

b) making an intermediate layer on the support core out of a material that is different from that of the support core and that of the body of the structure;

c) forming a series of channels regularly spaced apart around the core and opening out to face said intermediate layer, each of the channels being provided with a soluble insert comprising a mixture of organic binder and metal powder;

d) preheating the support core to a temperature greater than about 850° C. and making the body of the structure by thermal spraying under a vacuum or low pressure by means of a plasma torch, while maintaining the temperature of the support core at said temperature greater than 850° C.;

e) without dismantling the support core, machining channels in the form of grooves in the outside of the body of the structure;

f) filling the channels in the body of the structure with soluble inserts comprising a mixture of organic binder and metal powder;

g) forming a layer for closing the channels in the body of the structure and forming an outer envelope of the structure by thermal spraying under a vacuum or low pressure by means of a plasma torch, after preheating and while maintaining the support core at a temperature greater than about 850° C.;

h) eliminating the soluble inserts in the channels of the body of the structure, the soluble inserts in the channels formed around the support core, and the intermediate layer; and i) withdrawing the reusable support core.

According to a preferred characteristic, prior to the step of filling the channels machined in the body of the structure or around the support core, filament of tubular inserts, preferably made of a plastics material such as a polyamide resin for example, are inserted in the bottoms of the grooves forming the channels so as to make it possible subsequently to form cavities in the bottoms of the channels beneath the soluble inserts. The filamentary or tubular inserts are withdrawn prior to the following thermal spraying step.

In a particular embodiment, the step of filling the channels in the body of the structure with soluble inserts consists in an operation of filling the channels incompletely followed by a step of thermally spraying a metal material which finishes off the filling of the channels to form a metal layer which also covers the ribs between the channels, and then followed by a step of machining the surface of said metal layer until the free tops of said ribs have been laid bare.

When manufacturing structures of large dimensions, during the operations of thermal spraying with preheating of the support core to a temperature greater than about 850° C., additional heat is provided throughout the thermal spraying operation by means of an additional heater device close to the support core.

According to particular characteristics of the invention:

the body of the structure is made by thermally spraying a Cu—Ag—Zr alloy powder;

the support core is made of pure copper;

the intermediate layer is made by thermally spraying iron powder;

the filamentary inserts are constituted by filaments based on polyamide resin;

the step of thermally spraying a metal material to terminate filling of the channels consists in thermally spraying iron powder under a vacuum or under low pressure by means of a plasma torch;

the step of forming a layer for closing the channels in the body of the structure consists in thermally spraying a Cu—Ag—Zr alloy powder, and the step of forming an outer envelope consists in thermally spraying an alloy powder based on nickel such as a nickel-copper based alloy constituted by MONEL K500 or NU30AT; and the step of eliminating the soluble inserts from the channels in the body of the structure or from channels formed around the core is performed by circulating a fluid such as hydrochloric acid.

The method may include an additional step of forming a layer of porous copper by thermal spraying performed between forming the layer for closing the channels in the body of the structure and the step of forming an outer envelope.

In a first advantageous embodiment of the invention, step c) of forming a series of channels that are regularly distributed around the core takes place prior to step b) of making an intermediate layer and comprises machining the support core from the outside after it has been mounted on said axis of rotation to obtain channels in the form of grooves, and filling said channels in the support core by means of soluble inserts comprising a mixture of organic binder and metal powder.

In which case, the method may further include, after the step of making an intermediate layer, an additional step consisting in making a layer of low roughness by thermal spraying under a vacuum or under low pressure by means of a plasma torch, which layer of low roughness is made of a thermal barrier forming material of the metal type or of the oxide type.

By way of example, the thermal barrier may be made by thermally spraying a powder of a superalloy such as MCrAlYTa.

Advantageously, the thermal barrier is made, prior to spraying the superalloy, by spraying yttrium-containing zirconia powder so as to form a surface layer of said yttrium-containing zirconia material.

In another particular embodiment, step c) of forming a series of channels regularly distributed around the core takes place after step b) of making an intermediate layer, and comprises depositing a copper-based alloy on the intermediate layer, machining the copper-based alloy to define radial fins between which gaps are formed to constitute said channels, and filling said channels with soluble inserts comprising a mixture of organic binder and metal powder.

In which case, the method may further include a step consisting in depositing an additional iron layer to fill portions of the channels that have remained empty over the soluble insert and also to cover the fins, and a step consisting in machining said additional iron layer to cause the copper-based fins to emerge so as to conserve only a thin layer of iron over each soluble insert, said layer being flush with the free faces of the fins.

This second embodiment leads to a structure for the regenerative circuit of the finned heat exchanger type.

As a variant embodiment it is possible to achieve a structure of a regenerative circuit of the finned heat exchanger type within the frame of the first embodiment wherein step c) of forming a series of channels regularly distributed around the core takes place before step b) of making an intermediate layer, the channels regularly distributed around the core being machined in the core from the outside.

According to this variant embodiment, the method further includes, after step b) of making an intermediate layer on the core, a further step $b_1$) consisting in machining in the intermediate layer, outer grooves having a height h and a width l such that $h/l \leq 1$, to form radial fins during the step of making the body of the structure by thermal spraying.

Thus this variant of the first embodiment of the method according to the invention allows to make radial fins of small height which avoid the need of forming on the intermediate layer a thermal barrier by spraying a layer of material, but the fins do not delimit main channels opening out to face the intermediate layer. The main channels are formed by machining in the core from the outside.

The method of the invention can be applied in general manner to manufacturing a structure constituted by a heat exchanger.

The method of the invention is particularly adapted to manufacturing a structure constituted by a high heat flux combustion enclosure such as a combustion chamber and a nozzle of a rocket engine, in particular a high power rocket engine of the cryogenic type.

The invention also provides regenerative circuits obtained by the various implementations of the above-described method of manufacture.

BRIEF DESCRIPTION OF THE DRAWINGS

Other characteristics and advantages of the invention appear from the detailed description of particular implementations given below as examples and with reference to the accompanying drawings, in which:

FIG. 1 is a section through a wall of a regenerative circuit made using the manufacturing method of the invention and showing both the various component elements that constitute the final regenerative circuit and the various elements that are present temporarily during implementation of the method;

FIG. 2 is a diagram showing an example of an installation for implementing the method of the invention;

FIG. 6 is an axial section through an example of a reusable support core that can be used when implementing the method of the invention;

FIG. 7 is a section on line VII—VII of FIG. 6;

FIG. 14 is a section through a wall of a regenerative circuit manufactured using a known method based on electrodeposition; and FIG. 15 is a section through a wall of a regenerative circuit manufactured using a known method relying on plasma-forming.

DETAILED DESCRIPTION OF PARTICULAR IMPLEMENTATIONS

Figure 3:
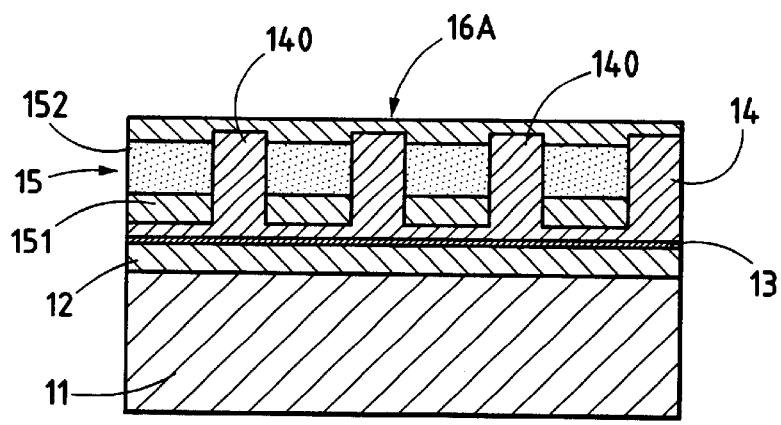
FIGS. 3 to 5 are sections through a wall of a regenerative circuit during various stages of the manufacturing method of the invention.
Figure 4:
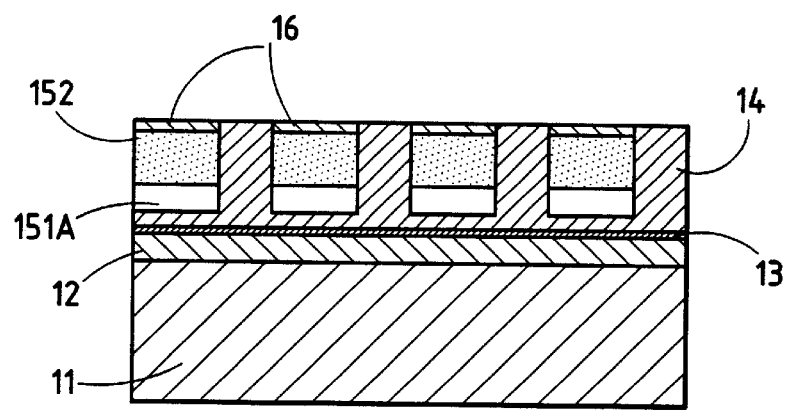
Figure 5:
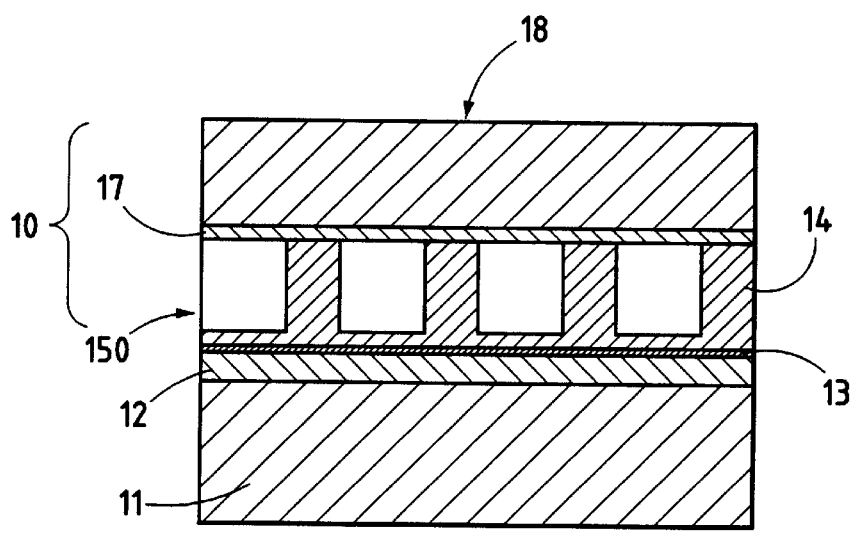

Particular implementations of the method of the invention are described with reference to manufacturing high heat flux regenerative circuits constituted by hollow structures defining rocket engine combustion chambers or nozzles.

FIG. 2 shows an hourglass-shaped example of such a rocket engine nozzle 30 comprising, in conventional manner, an upstream portion 31 forming a combustion chamber proper which converges towards a throat 32, which is in turn extended by a diverging downstream portion 33. For a rocket engine that uses liquid propellant, the propellant components are injected into the upstream portion 31 that forms the combustion chamber, and the gases that result from the combustion are evacuated via the throat 32 and the diverging portion 33 of the nozzle so as to generate the required thrust force. The wall of the nozzle 30 is provided with channels 150 that extend essential longitudinally and that convey a cooling fluid, which fluid may be one of the propellant components, for the purpose of cooling the wall of the nozzle 30 whose inside face is in contact with the hot gases. The channels 150 must be of well-defined shape and they must be distributed over the entire periphery of the nozzle 30 so as to ensure heat exchange suitable for optimizing performance. That is why the method of manufacturing the regenerative circuit constituted by the nozzle 30 is of particularly great importance in manufacturing a high quality product while limiting costs.

The manufacturing method of the invention consists in building up structural materials by thermal spraying, starting from the functional surface of the wall of the structure that is situated adjacent to the hot gases.

For a combustion chamber, building up a wall from the functional surface situated adjacent to the hot gases amounts to making the structure starting from its inside profile and in continuing to its outer envelope. Such a procedure is suitable both for chambers having a very small inside section for gas flow and for chambers of large dimensions.

The first step of the method of the invention consists in making a support core 11 whose outside surface represents the inside profile of the structure 10 that is to be made. FIGS. 6 and 7 show an example of a support core 11 which is designed to be reusable and which serves as tooling for the various thermal spraying and manufacturing operations that take place during the manufacture of the structure 10 which is constituted, by way of example, by the nozzle 30.

The core 11 is made up of two parts 111 and 112 which are in contact with each other via their narrowest section portion which corresponds to the throat of the nozzle that is to be manufactured. The two parts 111 and 112 can be united by mutual engagement via their end portions 111A and 112A situated in the throat. The core 11 has a shaft 113 passing therethrough and centered on the longitudinal axis of the core 11. The central shaft 113 is itself secured to a shaft 114 engaged in a housing 115 and keyed to the part 111 of the core so as to enable the core 11 to be rotated from a turntable 21 (FIG. 2) to which the shaft 114 is secured. An assembly system 118, e.g. of the screw-and-nut type disposed in a housing 116 of the core part 112 at the end of the shaft 113 cooperates with a washer 117 to hold together the two core parts 111 and 112.

The core 11 is made of a material whose coefficient of thermal expansion is very close to or slightly greater than that of the material constituting the body of the structure whose profile it defines. This makes it possible to obtain a profile that is accurate without errors due to expansion of the support core 11, and greatly reduces stress levels during the operations of depositing material.

By way of example, if the body 14 of a regenerative circuit is of Cu—Ag—Zr alloy, then the core 11 can be made of pure copper.

According to another aspect of the method of the invention, after the core has been made and before beginning the operations of depositing material for building up the structure 10 that is to be manufactured, an intermediate layer 12 (FIGS. 1 and 3 to 5) is disposed over the entire outside surface of the core 11, which layer is made of a material that is different from that of the core 11 and from that of the structure 10 to be made, which material is suitable for being destroyed by being chemically dissolved at the end of the process for manufacturing the structure 10 so as to enable the resulting structure 10 to be separated from the core 11 without damaging the core, thereby enabling the core to be reusable and making it easy to withdraw because of the way it is built up from two separable parts 111 and 112 (FIG. 6).

The intermediate layer 12 for separating the core 11 from the structure 10 may be made of iron, for example. It can be deposited by thermally spraying iron powder under a vacuum or low pressure by means of a plasma torch 23 controlled by a robot 22, the support core 11 being placed vertically on a turntable 21 and being constrained to rotate therewith by the coupling shaft 114 (FIGS. 2 and 6). The method of thermal spraying in a vacuum by means of a plasma torch, also known as the vacuum plasma spraying (VPS) method, is itself known and therefore does not require more detailed description.

Figure 8:
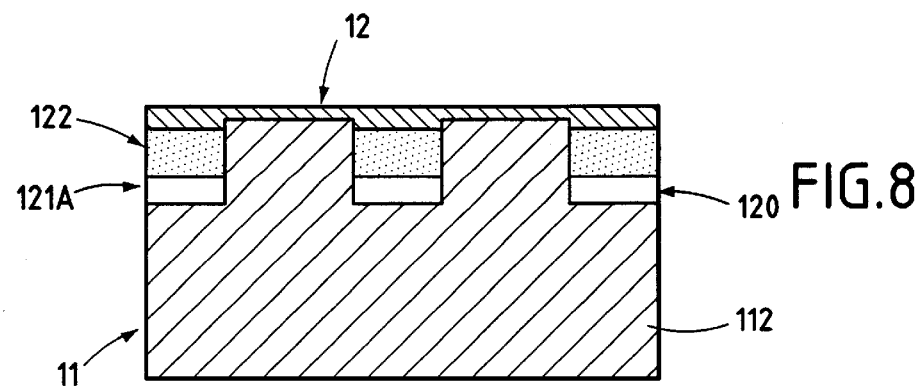
FIG. 8 is an enlarged view of a portion of FIG. 7, showing a part of the process for manufacturing the reusable support core.

According to a specific embodiment of the invention, in order to facilitate and accelerate dissolving of the intermediate layer 12 for the purpose of separating and disengaging the core 11 at the end of the process for manufacturing the structure 10, longitudinal channels 120 in the form of grooves machined in the core are provided in the outer peripheral surface of the core 11 that is mounted on the turntable 21. Prior to depositing the intermediate layer 12 on the core 11, filamentary inserts, e.g. of plastics material such as a material based on polyamide resin, for example, are placed in the bottoms of the grooves 120 and then the channels 120 are filled with soluble inserts 122 comprising a mixture of organic binder and metal powder (FIG. 8). The filamentary inserts can then be withdrawn to leave an empty space 121A in the bottom of each channel 120, while the soluble inserts 122 close off the channels 120, thereby making it possible to proceed with depositing the intermediate layer 12.

The presence of channels 120 at the periphery of the core 11, and the fact that the channels are closed only partially by the soluble inserts 122, facilitate the operation of dissolving the intermediate layer 12 at the end of the process of manufacturing the plasma-formed structure 10. When chemical dissolution is performed by circulating a fluid such as hydrochloric acid, the hydrochloric acid can circulate easily and at once in the bottoms of the channels 120 so as to begin by dissolving the soluble inserts 122 and then, by circulating along the channels 120 of the core 11 once they have been completely disengaged, can also serve to dissolve the intermediate layer 12 quickly, i.e. without having enough time to attack the core proper or the elements of the structure 10 that are made of copper or nickel based alloys.

After the intermediate layer 12 has been deposited on the support core 11, and possibly after performing a machining operation while the core 11 remains on the turntable 21 in order to obtain the exact profile of the structure 10 that is to be manufactured, the process for manufacturing the structure 10 proper can begin with thermally spraying a fine layer 13 of a thermal barrier forming material onto the intermediate layer 12. The presence of a thermal barrier made by spraying onto the support 11, 12 even before the remainder of the structure 10 is made, serves ultimately to obtain a surface 13 of the structure 10 that has low roughness, insofar as the roughness of the deposit 13 is then conditioned by the roughness of the intermediate layer 12.

The thermal barrier 13 may be constituted by a superalloy or by MCrAlYTa with or without the presence of a surface layer of yttrium-containing zirconia.

The thermal barrier 13 is made by the same thermal spraying method (VPS) as that which is subsequently used for making the body 14 of the structure 10, and it is made using the same installation as that described above with reference to FIG. 2. The thermal barrier 13 makes it possible to guarantee good adhesion because of the interdiffusion that takes place during subsequent spraying between said layer and the body 14 of the copper-based regenerative circuit.

The body 14 of the structure 10 of copper-based material is built up on the support core 11 by thermal spraying; specifically vacuum spraying or low pressure spraying by means of the plasma torch 23. The sprayed metal powder satisfies quality criteria suitable for obtaining the final deposit (chemical composition, physical properties) and the grain size of the powder is adapted to spraying conditions. When spraying Cu—Ag—Zr the powder is of a grain size smaller than 106 $\mu$m, and preferably lying in the range 10 $\mu$m to 63 $\mu$m, and it has a low oxygen content (<150 ppm).

Thermal spraying for manufacturing the body 14 as for manufacturing the thermal barrier 13 is performed on the support core 11 after it has been preheated to more than 850° C., and this temperature needs to be maintained throughout the duration of thermal spraying. For components of large size, this temperature is maintained by additional heater means 24 (FIG. 2) which, depending on the diameter of the component, may rely on Joule effect heating, on induction heating or else on heating by means of an additional plasma torch which is not used for spraying a metal powder and whose operational characteristics may be optimized for the sole heating function. This condition of additional heating is essential for obtaining a deposit having good mechanical characteristics.

Channels 150 are then machined in the body 14 in conventional manner, but while benefiting from the spraying support core 11 as positioning tooling. There is thus no need to mount and dismount tooling between successive operations during manufacture. The channels 150 can be machined from the outside regardless of the size of the chamber: there is no difficulty associated with chambers of small sizes.

Like the channels 120 of the core, the channels 150 are filled in part by means of soluble inserts 152 made up of an organic binder and of a metal powder. This type of insert fits regardless of the profile of the structure 10 and regardless of any variations in the section of the channels 150. In the bottoms of the channels, as in the channels 120 of the support core 11, cavities 151A (FIGS. 1 and 4) are formed by temporarily using filaments or tubes of plastics material 151, e.g. based on polyamide resin (FIG. 3). In practice, the filaments 151 are withdrawn as soon as the soluble inserts 152 have been made, thereby leaving gaps 151A in the bottoms of the channels 150 even before the following step of depositing an additional layer 16A (contrary to that which is shown in FIG. 3, where the layer 16A is shown in the drawing as already being present). The presence of empty spaces 151A in the bottoms of the channels 150 plays a very important role during the subsequent step of chemically dissolving the soluble inserts 152 together with the remainder 16 of the additional layer 16A by allowing acid to flow immediately along the full length of the channels 150. In this way, the saving in time for chemically dissolving the soluble inserts 152 and the residual portions 16 of the additional layer 16A is very considerable, as in the case of dissolving the intermediate layer 12 which takes place at the end of the manufacturing process so as to enable the core 11 to be withdrawn, and this operation benefits from accelerated circulation of acid along the channels 120 of the core 11.

The inserts 15 constituted by the soluble inserts 152 superposed on the filamentary inserts 151 are placed in the channels 150 while leaving respective small setbacks in the top portions of the channels relative to the ribs 140 of the body 14 between the various channels 150 (FIG. 3). As a result, during subsequent deposition of an additional layer 16A by thermal spraying (VPS), e.g. an additional layer of iron, the iron is deposited with sufficient adhesion because of the anchoring that results between the portions 16 of the layer 16A that penetrate into the setback top portions of the channels 150.

Final filling of the channels 150 is thus performed by thermally spraying iron, preferably under a vacuum or at low pressure. This deposit 16, after surface machining to lay bare the tops of the ribs 140 of the body 14 (FIG. 4), ensures accuracy for the sections of the channels and for the roughness required for the following layer 17.

In some cases, if requirements on the accuracy of the sections of the channels 150 and on the requested roughness are less severe, the new layers 17 can be deposited directly on the organic binder of the soluble inserts 152, and under such circumstances the inserts are flush with the tops of the ribs 140. The step that consists in depositing a layer 16A and in machining this layer until only the portions 16 remain that finish off the channels 150 can then be omitted.

In all cases, closure of the channels 150 by means of a layer of a material 17, and building up of material to constitute an outer envelope 18 are performed by thermal spraying, specifically by vacuum spraying or by low pressure spraying using the same plasma torch 23, with the structure 10 that is being built up remaining in place on the core 11 that is in position on the turntable 14. As when making the thermal barrier 13 and the body 14, the thermal spraying that builds up the layer 17 for closing the channels 150 and that builds up the outer envelope 18 is performed on the support core 11 after it has been preheated to more than 850° C. and then maintained at this temperature throughout the duration of the spraying, with heat being delivered where appropriate by the additional heater device 24.

The channels 150 are initially closed, e.g. by spraying Cu—Ag—Zr alloy powder so as to form a closure layer 17, and then the outer envelope 18 is built up by spraying a powder of a nickel-based alloy, for example.

When spraying Cu—Ag—Zr, the particles of powder can be of a size lying in the range 10 $\mu$m to 63 $\mu$m, and the powder should have a low oxygen content (<150 ppm).

Optimum selection of the alloy for use in making the envelope 18 takes account of compatibility with the underlayer 17 based on copper (e.g. Cu—Ag—Zr) in terms of spraying possibilities, physical properties, inter-diffusion, and similarity of heat treatment cycle. When making a regenerative circuit chamber that is based on copper, including Cu—Ag—Zr, the alloy used is of the type based on nickel-copper (MONEL K500 or NU30AT).

As mentioned above, after the envelope 18 has been made, the soluble inserts 152 in the channels 150 of the body 14 of the structure 10, the soluble inserts in the channels 120 of the support core 11, and the intermediate layers 12, 16 deposited using iron are all eliminated by causing hydrochloric acid to circulate in a de-aerated medium. Because of the presence of gaps such as 151 in the bottoms of the channels 150 in the body 14 and also in the bottoms of the channels 120 in the core 11, and extending over the full length of the channels 150 and 120, acid circulation takes place very quickly, thereby accelerating the process of making the structure while guaranteeing that the component elements of the final structure 10 or of the core 11 are not attacked.

It is important to observe that the core 11 remains secured to the structure 10 throughout the manufacturing process and thus serves as tooling both for the thermal spraying sequences and for the machining steps. Positioning accuracy can thus be very great and it is possible to machine the channels 150 even if the wall thickness of the body 14 is very small, e.g. of the order of 0.7 mm or even less.

FIG. 1 is a section through the layers making up a regenerative circuit 10 implemented in accordance with the invention, including a thermal barrier 13, a body 14, a layer 17 for closing the channels 150, and an outer envelope 18. FIG. 1 also shows the elements that play a temporary role during the manufacturing method and which do not form part of the final structure 10 of the regenerative circuit, i.e. the support core 11, an intermediate layer 12, inserts 15 comprising filamentary inserts 151 and soluble inserts 152, and elements 16 of a layer for covering the channels 150.

Figure 10:
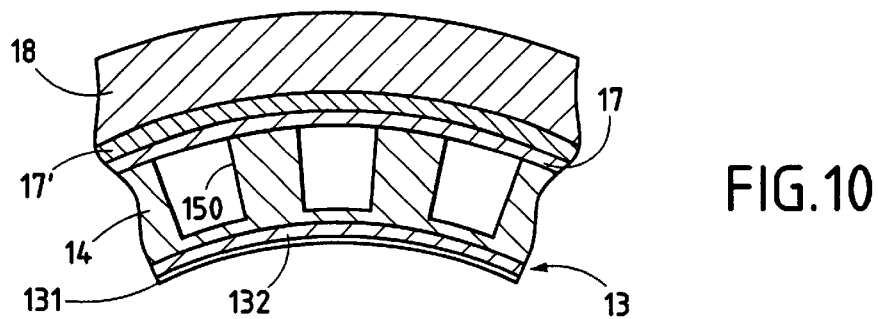
FIG. 10 is a section through a final wall of a regenerative circuit of the invention of the thermal barrier type.

FIG. 10 is a fragmentary section on a sector through the final product obtained by the method of the invention when making a regenerative circuit having a thermal barrier implemented in the manner described above. In this case, the thermal barrier 13 may comprise a thin superficial first thermal barrier 131, e.g. based on zirconia, and a second thermal barrier 132 based on an MCrAlY alloy. The thermal barrier 13 is formed on the inside face of the jacket 14 which is made of copper alloy and whose channels 150 are closed by the copper alloy layer 17, itself covered by the nickel envelope 18.

In a variant implementation, it is possible during manufacture of the regenerative circuit, to deposit a porous layer 17', e.g. a layer of porous copper by plasma-forming between the copper-based layer 17 and the nickel-based layer 18, which porous layer can be obtained directly by thermal spraying onto the copper-based layer 17 prior to depositing the nickel-based layer 18. Such a porous layer 17' remains optional.

Figure 13:
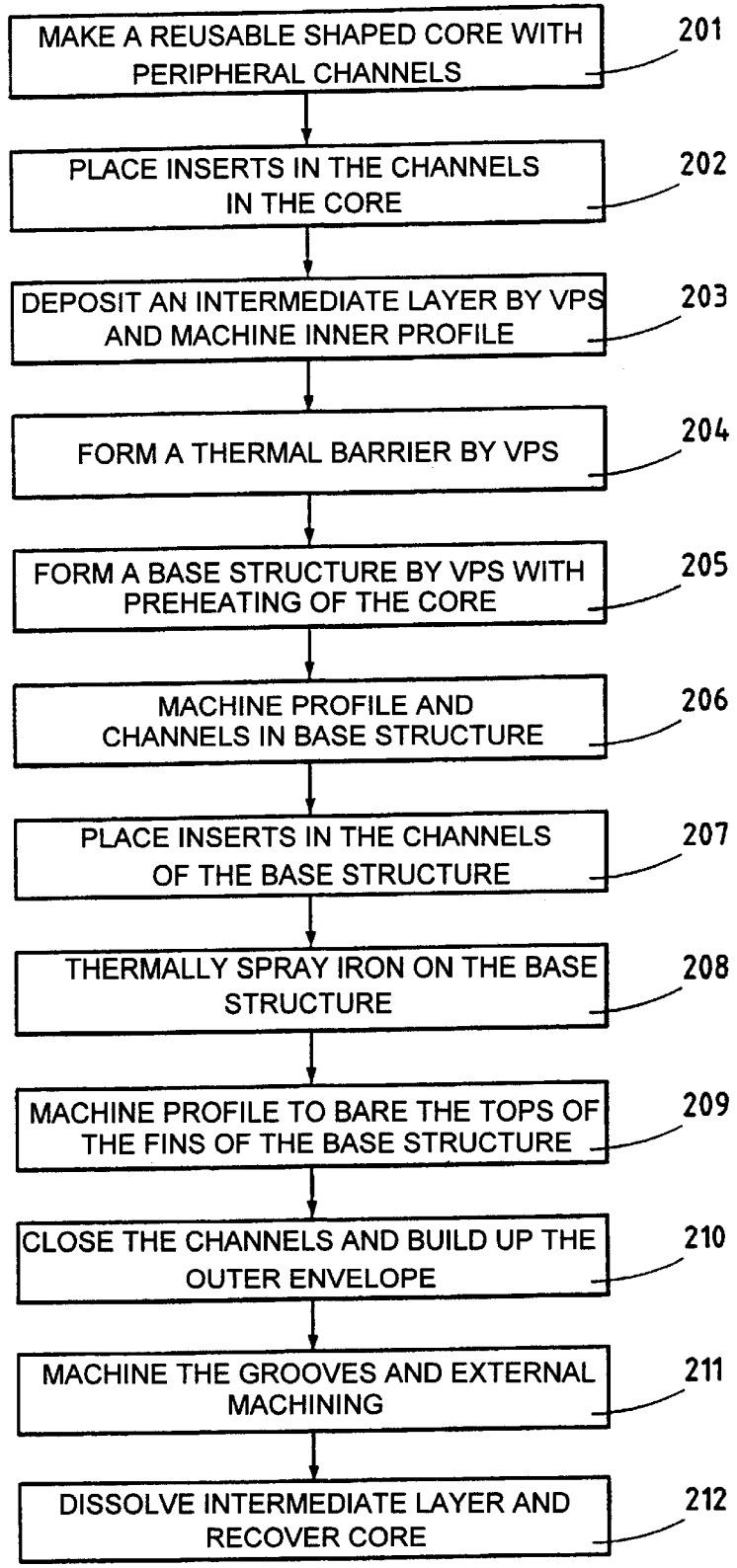
FIG. 13 is a flow chart giving the main steps of an example of the manufacturing method of the invention in succession.

FIG. 13 is a flow chart summarizing the main steps 201 to 212 of an example of the manufacturing method of the invention.

Step 201 thus comprises making a shaped support core 11, e.g. based on pure copper, and designed to be reusable and capable of being made out of at least two parts if the shape of the structure to be manufactured so requires, the core being provided with longitudinal channels or grooves 120 made by machining its periphery.

Step 202 comprises placing inserts in the channels 120 with filamentary inserts being present temporarily in the bottoms of the channels 120, and with soluble inserts 122 being made using an organic binder and powder, after which the filamentary inserts are withdrawn to leave cavities 121A in the bottoms of the channels 120.

Step 203 consists in depositing an intermediate layer 12 on the support core 11 fitted with its soluble inserts 122, deposition being performed by thermal spraying, and then in machining the intermediate layer 12 so as to define accurately the inside profile of the structure 10.

Step 204 consists in forming a thermal barrier 13 by thermal spraying, the support being maintained at a temperature greater than 850° C.

Step 205 comprises forming the base body 14 of the structure 10 by thermal spraying, the support being maintained at a temperature greater than 850° C.

Step 206 comprises machining the profile and the channels 150 in the outside face of the base body 14 of the structure 10.

Step 207 comprises placing inserts 15 in the channels 150 with filamentary inserts 151 being temporarily present in the bottoms of the channels 150, with soluble inserts 152 being made by means of an organic binder and powder, and with the filamentary inserts 151 being withdrawn to form cavities 151A in the bottoms of the channels 150.

Optional step 208 consists in depositing a layer of pure iron 16A by thermal spraying on the base body 14, with the layer being anchored in the top portions of the channels 150, with the layer 16A defining the shape and the roughness of the channels 150.

Step 209 which is associated with step 208 consists in machining the layer 16A so as to bare the tops of the ribs 140 of the base body 14 between the channels 150.

Step 210 consists in closing the channels 150 by thermal spraying so as to form a closure layer 17 while the support core 11 is maintained at a temperature greater than 850° C., and while still maintaining said temperature, in thermally spraying a material to form the outer envelope 18, with a porous layer 17' optionally being deposited before the outer envelope 18 is deposited.

Step 211 consists in machining the grooves and in machining the outside of the structure 10 constituting the regenerative circuit.

Step 212 is a final step in which the soluble inserts still located in the channels 120 and 150 are dissolved chemically together with the intermediate layers 12 and 16 of pure iron, with acid circulating quickly along the bottoms of the channels 120 and 150, after which the support core 11 can be recovered.

Figure 9:
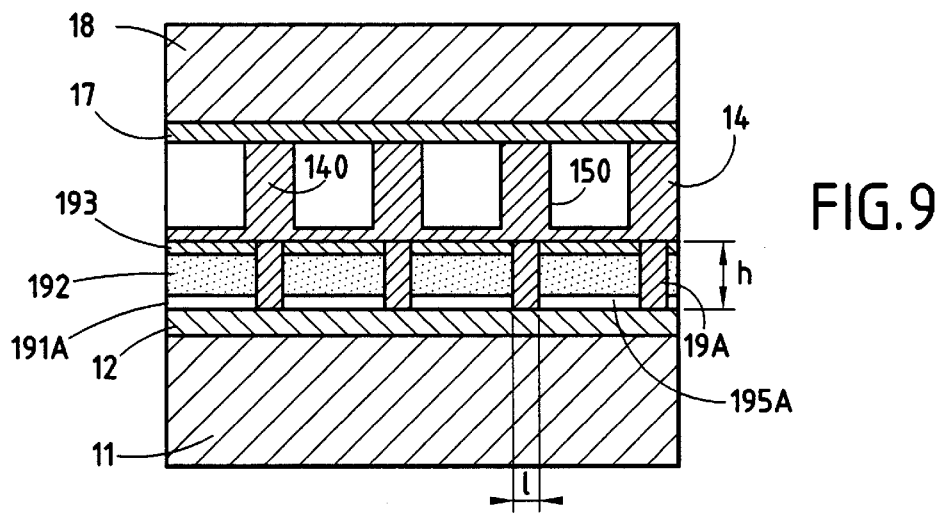
FIG. 9 is a section through a wall of a regenerative circuit showing a portion of the manufacturing process in the case of a specific embodiment applied to the manufacture of a wall of a finned heat exchanger.

With reference to FIG. 9, there follows a description of a specific embodiment of the method of the invention that leads to a regenerative circuit in which the thermal barrier 13 of the circuit of FIG. 10 is replaced by a finned heat exchanger having radial fins 19A that leave longitudinal channels 195A between them.

In the case of FIG. 9, after the step of forming an intermediate layer 12 of iron on the core 11, in a manner that can be analogous to that described above, there follows a step of depositing a copper-based alloy, such as a Cu—Ag—Zr alloy, for example, on the intermediate layer 12, and then a step of machining the copper-based alloy so as to define radial fins 19A between which empty spaces or channels 195A are formed.

In this specific embodiment, the radial fins 19A have a height h which is rather large and is such that the ratio between the height h and the width l of a fin is greater than 1, so that the fins 19A define between them gaps 195A which have a height which is substantially equivalent to the channels 120 of the core 11 according to the embodiment illustrated on FIG. 8.

Thereafter, the empty spaces 195A in the form of channels are partially filled in a manner that is analogous to the operations of partially filling the channels 120 in the core 11 or the channels 150 in the body 14 as described above. In this way, filamentary inserts can be inserted temporarily into the bottoms of the gaps 195A between the fins 19A so as to enable said gaps 195A to be filled in part by soluble inserts 192 beneath which spaces 191A are formed on removal of the filamentary inserts. The soluble inserts 192 preferably remain set back from the tops of the fins 19A so as to enable a layer of iron to be deposited by the VPS method, said layer filling in the empty portions of the gaps 195A over the soluble inserts 192 and also covering the fins 19A.

The following step consists in machining the layer of iron so that the copper-based fins 19A emerge while leaving only a thin layer 193 of iron on top of each soluble insert 192, said layer 193 being flush with the top faces of the fins 19A. A copper-based alloy is then deposited to form the body 14 of the regenerative circuit, after which, in a manner identical to that described above with reference to FIGS. 3 to 5, channels 150 are machined therein, the channels 150 are filled in part by means of soluble inserts 152 as shown in FIG. 3, a layer of iron is deposited by the VPS method (as shown in FIG. 3), and said layer of iron is machined so as to cause the fins or ribs 140 defined between the channels 150 to emerge (as shown in FIG. 4).

The following step consists in depositing a copper-based alloy 17 and then a nickel-based alloy 18. In a variant, a layer 17' of porous copper can also be deposited on the copper-based alloy 17 prior to depositing the nickel-based alloy 18.

The final step consists in causing acid to circulate in the cavities 191A formed between the fins 19A, so as to enable the soluble inserts 192, the residual layers of iron 193, and the intermediate layer 12 of iron to be dissolved rapidly, thus enabling the core 11 to be recovered and reused.

It will be observed that when a regenerative circuit is made according to the variant of the method as described above with reference to FIG. 9, fins 19A exist that serve to define between them cavities 195A that open out facing the intermediate layer 12 formed on the core 11. Under such circumstances, these cavities 195A can act as the cavities 120 of the core 11, and the core 11 can be of conventional structure without fluting. The method described above with reference to FIG. 9 nevertheless remains compatible with using a fluted core such as that shown in FIG. 8. Under such circumstances, there exists merely a first series of cavities 120 formed in the core 11 on one side of the intermediate layer 12, and a second series of cavities 195A formed between the fins 19A that are connected to the body 14 on the other side of the intermediate layer 12.

Figure 11:
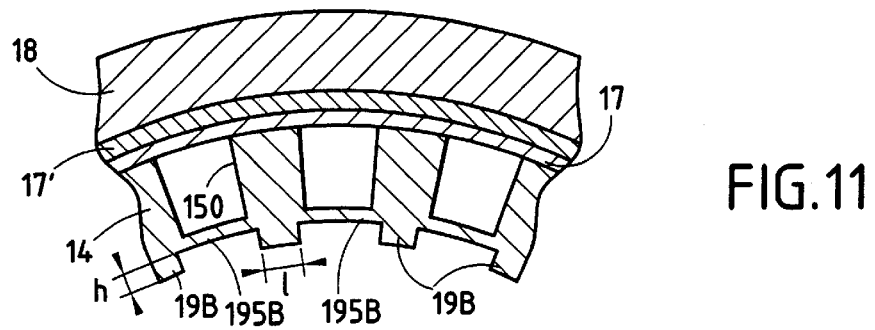
FIG. 11 is a section through a final wall of a regenerative circuit of the invention of the finned heat exchanger type.
Figure 12:
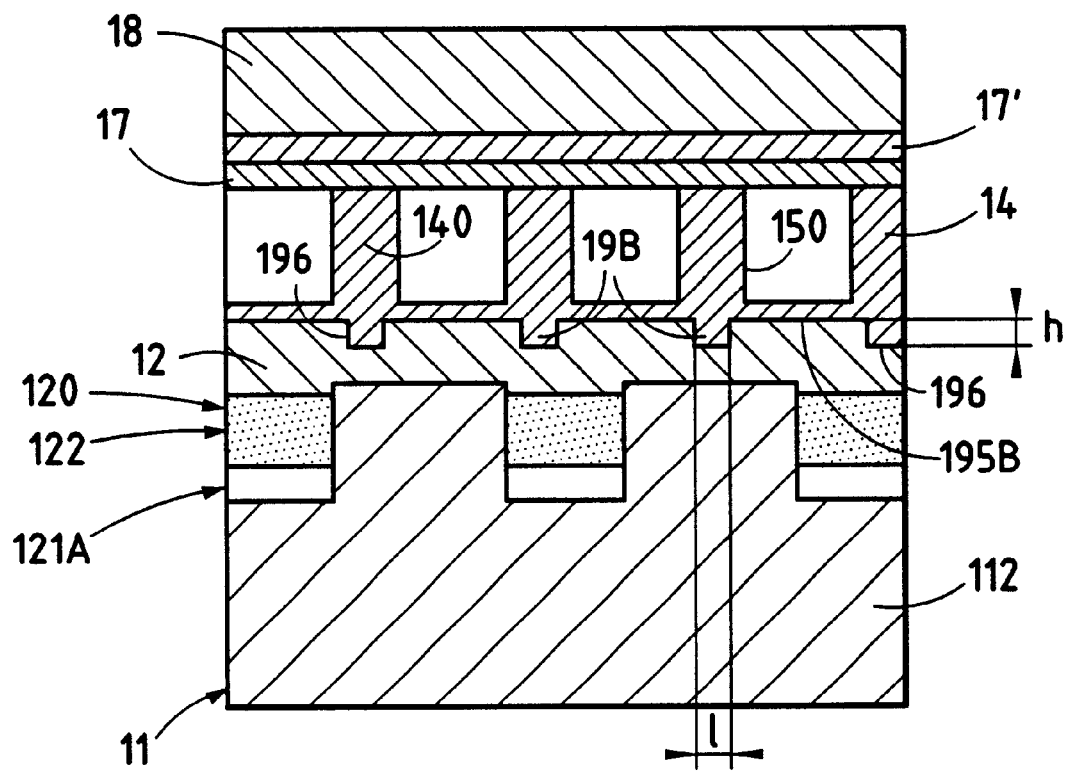
FIG. 12 is a section through a wall of a regenerative circuit showing a portion of the manufacturing process in the case of another specific embodiment applied to the manufacture of a wall of a finned heat exchanger.

With reference to FIGS. 11 and 12, there follows a description of another embodiment of the method according to the present invention, that leads to a regenerative circuit in which the thermal barrier 13 of the circuit of FIG. 10 is replaced by a finned heat exchanger having radial fins 19B that leave longitudinal channels 195B between them, the radial fins 19B having a small height h such that the ratio between the height h of the radial fins 19B and the width l of these fins be smaller than or equal to 1. In this specific embodiment, the step of making an intermediate layer 12 on the support core 11 takes place after the step of forming a series of channels 120 that are regularly distributed around the core 11, the channels 120 in the form of grooves being machined from the outside in the core 11 and filled by means of soluble inserts as previously mentioned, in particular with reference to FIG. 13.

According to the specific embodiment of FIG. 12, the method comprises, after the step of making an intermediate layer 12 on the support core 11, an additional step consisting in manufacturing in the intermediate layer 12 external grooves having a height h and width l such that h/l≦1, to allow radial fins 19B to be formed during the subsequent step of making the body 14 of the structure 10 by thermal spraying.

In such a case, the spaces 195B between the fins 19B are occupied by the material of the intermediate layer 12 until such intermediate layer 12 is dissolved and such spaces 195B cannot contribute to defining channels opening out to face the intermediate 12 contrary to spaces 195A of FIG. 9. In the embodiment of FIG. 12, the provision of channels 120 at the periphery of the core 11 is thus compulsory and not only optional.

FIG. 11 shows the aspect of a portion of a wall manufactured according to the method illustrated with reference to FIG. 12, after the intermediate layer 12 has been dissolved.

What is claimed is:

1. A method of manufacturing a high heat flux regenerative circuit comprising a structure having an inner functional surface in contact with a first fluid and a set of channels formed in a body of the structure for conveying a second fluid in heat exchange relationship with the first fluid, the method comprising the following steps:
   a) placing a support core representing the inner profile of the structure about an axis of rotation, the support core being made of a material whose coefficient of thermal expansion is very close to or slightly greater than that of a material of the body of the structure;
   b) making an intermediate layer on the support core out of a material that is different from that of the support core and that of the body of the structure;
   c) forming a series of channels regularly spaced apart around the core and opening out to face said intermediate layer, each of the channels being provided with a soluble insert comprising a mixture of organic binder and metal powder;
   d) preheating the support core to a temperature greater than about 850° C. and making the body of the structure by thermal spraying under a vacuum or low pressure by means of a plasma torch, while maintaining the temperature of the support core at said temperature greater than 850° C.;
   e) without dismantling the support core, machining channels in the form of grooves in the outside of the body of the structure;
   f) filling the channels in the body of the structure with soluble inserts comprising a mixture of organic binder and metal powder;
   g) forming a layer for closing the channels in the body of the structure and forming an outer envelope of the structure by thermal spraying under a vacuum or low pressure by means of a plasma torch, after preheating and while maintaining the support core at a temperature greater than about 850° C.;
   h) eliminating the soluble inserts in the channels of the body of the structure, the soluble inserts in the channels form around the support core, and the intermediate layer; and
   i) withdrawing the reusable support core, wherein said structure is built up from said inner functional surface around said reusable support core.

2. A method according to claim 1, wherein, prior to the step of filling the channels machined in the body of the structure or around the support core, filament of tubular inserts are inserted in the bottoms of the grooves forming the channels so as to make it possible subsequently to form cavities in the bottoms of the channels beneath the soluble inserts by withdrawing the filamentary inserts prior to the following thermal spraying step.

3. A method according to claim 1, wherein the step of filling the channels in the body of the structure with soluble inserts consists in an operation of filling the channels incompletely followed by a step of thermally spraying a metal material which finishes off the filling of the channels to form a metal layer which also covers the ribs between the channels, and then followed by a step of machining the surface of said metal layer until the free tops of said ribs have been laid bare.

4. A method according to claim 1, wherein, during the operations of thermal spraying with preheating of the support core to a temperature greater than about 850° C., additional heat is provided throughout the thermal spraying operation by means of an additional heater device close to the support core.

5. A method according to claim 1, wherein the body of the structure is made by thermally spraying a Cu—Ag—Zr alloy powder.

6. A method according to claim 5, wherein the support core is made of pure copper.

7. A method according to claim 1, wherein the intermediate layer is made by thermally spraying iron powder.

8. A method according to claim 2, wherein the filamentary inserts are constituted by filaments based on polyamide resin.

9. A method according to claim 3, wherein the step of thermally spraying a metal material to terminate filling of the channels consists in thermally spraying iron powder under a vacuum or under low pressure by means of a plasma torch.

10. A method according to claim 1, wherein the step of forming a layer for closing the channels in the body of the structure consists in thermally spraying a Cu—Ag—Zr alloy powder, and the step of forming an outer envelope consists in thermally spraying an alloy powder based on nickel.

11. A method according to claim 1, including an additional step of forming a layer of porous copper by thermal spraying performed between forming the layer for closing the channels in the body of the structure and the step of forming an outer envelope.

12. A method according to claim 1, wherein the step of eliminating the soluble inserts from the channels in the body of the structure or from channels formed around the core is performed by circulating a fluid.

13. A method according to claim 1, wherein step c) of forming a series of channels that are regularly distributed around the core takes place prior to step b) of making an intermediate layer and comprises machining the support core from the outside after it has been mounted on said axis of rotation to obtain channels in the form of grooves, and filling said channels in the support core by means of soluble inserts comprising a mixture of organic binder and metal powder.

14. A method according to claim 13, further comprising, after the step of making an intermediate layer an additional step consisting in making a layer of low roughness by thermal spraying under a vacuum or under low pressure by means of a plasma torch, which layer of low roughness is made of a thermal barrier forming material of the metal type or of the oxide type.

15. A method according to claim 14, wherein the body of the structure is made by thermally spraying a Cu—Ag—Zr alloy powder, and wherein the thermal barrier is made by thermally spraying a powder of a superalloy.

16. A method according to claim 15, wherein the thermal barrier is made, prior to spraying the superalloy, by spraying yttrium-containing zirconia powder so as to form a surface layer of said yttrium-containing zirconia material.

17. A method according to claim 1, wherein step c) of forming a series of channels regularly distributed around the core takes place after step b) of making an intermediate layer, and comprises depositing a copper-based alloy on the intermediate layer, machining the copper-based alloy to define radial fins between which gaps are formed to constitute said channels, and filling said channels with soluble inserts comprising a mixture of organic binder and metal powder.

18. A method according to claim 17, further comprising a step consisting in depositing an additional iron layer to fill portions of the channels that have remained empty over the soluble insert and also to cover the fins, and a step consisting in machining said additional iron layer to cause the copper-based fins to emerge so as to conserve only a thin layer of iron over each soluble insert, said layer being flush with the free faces of the fins.

19. A method according to claim 13, characterized in that it further comprises, after step b) of making an intermediate layer on the support core, the additional step $b_1$) of machining in the intermediate layer outer grooves having a height h and a width l such that $h/l \leq 1$, to subsequently form radial fins during the step of making the body of the structure by thermal spraying.

20. A method according to claim 2, wherein the filament or tubular inserts are made of a plastics material.

21. A method of manufacturing a high heat flux regenerative circuit comprising a structure constituted by a high heat flux combustion chamber for a rocket engine, said structure having an inner functional surface in contact with a first fluid and a set of channels formed in a body of the structure for conveying a second fluid in heat exchange relationship with the first fluid, the method comprising the following steps:

a) placing a support core representing the inner profile of the structure about an axis of rotation, the support core being made of a material whose coefficient of thermal expansion is very close to or slightly greater than that of a material of the body of the structure;

b) making an intermediate layer on the support core out of a material that is different from that of the support core and that of the body structure;

c) forming a series of channels regularly spaced apart around the core and opening out to face said intermediate layer, each of the channels being provided with a soluble insert comprising a mixture of organic binder and metal powder;

d) preheating the support core to a temperature greater than about 850° C. and making the body of the structure by thermal spraying under a vacuum or low pressure by means of a plasma torch, while maintaining the temperature of the support core at said temperature greater than 850° C.;

e) without dismantling the support core, machining channels in the form of grooves in the outside of the body of the structure;

f) filling the channels in the body of the structure with soluble inserts comprising a mixture of organic binder and metal powder;

g) forming a layer for closing the channels in the body of the structure and forming an outer envelope of the structure by thermal spraying under a vacuum or low pressure by means of a plasma torch, after preheating and while maintaining the support core at a temperature greater than about 850° C.;

h) eliminating the soluble inserts in the channels of the body of the structure, the soluble inserts in the channels formed around the support core, and the intermediate layer; and i) withdrawing the reusable support core; wherein said structure is built up from said inner functional surface around said reusable support core.

22. A method of manufacturing a high heat flux regenerative circuit comprising a structure constituted by a heat exchanger, said structure having an inner functional surface in contact with a first fluid and a set of channels formed in a body of the structure for conveying a second fluid in heat exchange relationship with the first fluid, the method comprising the following steps:

a) placing a support core representing the inner profile of the structure about an axis of rotation, the support core being made of a material whose coefficient of thermal expansion is very close to or slightly greater than that of a material of the body of the structure;

b) making an intermediate layer on the support core out of a material that is different from that of the support core and that of the body of the structure;

c) forming a series of channels regularly spaced apart around the core and opening out to face said intermediate layer, each of the channels being provided with a soluble insert comprising a mixture of organic binder and metal powder;

d) preheating the support core to a temperature greater than about 850° C. and making the body of the structure by thermal spraying under a vacuum or low pressure by means of a plasma torch, while maintaining the temperature of the support core at said temperature greater than 850° C.;

e) without dismantling the support core, machining channels in the form of grooves in the outside of the body of the structure;

f) filling the channels in the body of the structure with soluble inserts comprising a mixture of organic binder and metal powder;

g) forming a layer for closing the channels in the body of the structure and forming an outer envelope of the structure by thermal spraying under a vacuum or low pressure by means of a plasma torch, after preheating and while maintaining the support core at a temperature greater than about 850° C.;

h) eliminating the soluble inserts in the channels of the body of the structure, the soluble inserts in the channels formed around the support core, and the intermediate layer; and i) withdrawing the reusable support core, wherein said structure is built up from said inner functional surface around said reusable support core.

23. A method according to claim 10, wherein the step of forming an outer envelope consists in thermally spraying a powder of a nickel-copper based alloy constituted by MONEL K500 or NU30AT.

24. A method according to claim 12, wherein the step of eliminating the soluble inserts from the channels in the body of the structure or from channels formed around the core is performed by circulating hydrochloric acid.

25. A method according to claim 15, wherein the thermal barrier is made by thermally spraying a powder of MCrAlYTa.

26. A method according to claim 20, wherein the filament or tubular inserts are made of a polyamide resin.

27. A method according to claim 1, wherein said inner functional surface has a thermal barrier in contact with said first fluid, said body being made of copper alloy within which are defined a plurality of channels for conveying said second fluid in heat exchange relationship with said first fluid, said channels being closed by a copper alloy layer and an outer envelope made of nickel formed on said copper alloy layer, wherein said thermal barrier comprises a thin superficial first thermal barrier based on zirconia and a second thermal barrier formed on an inside face of said body.

28. A method according to claim 27, wherein said structure has radial fins that leave longitudinal channels between said radial fins, said radial fins having a small height h of the radial fins and the width l of said radial fins being smaller than or equal to 1.

29. A method according to claim 27 wherein a layer of porous copper is interposed between said copper alloy layer and said outer envelope made of nickel.

30. A method according to claim 28 wherein a layer of porous copper is interposed between said copper alloy layer and said outer envelope made of nickel.

\* \* \* \* \*